United States Patent
Ng et al.

(10) Patent No.: US 8,156,150 B2
(45) Date of Patent: Apr. 10, 2012

(54) FUSION GENERAL LEDGER

(75) Inventors: Rondy Ng, Redwood Shores, CA (US); Robert C. Zwiebach, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 438 days.

(21) Appl. No.: 12/484,596

(22) Filed: Jun. 15, 2009

(65) Prior Publication Data

US 2010/0318572 A1    Dec. 16, 2010

(51) Int. Cl.
*G06F 17/30* (2006.01)
(52) U.S. Cl. ...................................................... 707/791
(58) Field of Classification Search ............... 707/791, 707/803
See application file for complete search history.

(56) References Cited

U.S. PATENT DOCUMENTS

| | | | |
|---|---|---|---|
| 2002/0055901 A1* | 5/2002 | Gianakouros et al. | 705/37 |
| 2006/0010156 A1* | 1/2006 | Netz et al. | 707/102 |
| 2006/0201775 A1* | 9/2006 | Tedesco et al. | 194/206 |
| 2008/0307503 A1* | 12/2008 | Waters | 726/4 |
| 2009/0198657 A1* | 8/2009 | Hattori | 707/3 |
| 2009/0319553 A1* | 12/2009 | Le Brazidec et al. | 707/102 |

* cited by examiner

*Primary Examiner* — John E Breene
*Assistant Examiner* — Dennis Myint
(74) *Attorney, Agent, or Firm* — Kilpatrick Townsend & Stockton LLP (57) ABSTRACT

A database system combines a general ledger and a multi-dimensional database. The general ledger and multi-dimensional database are mapped such that relationships between the general ledger and multi-dimensional database are characterized with metadata dimensions. Using the mapping, data can be received into the general ledger and stored in both the general ledger and multi-dimensional database substantially simultaneously. Further, a synchronization of the data copies changes to the data automatically from the general ledger to the multi-dimensional database. Thus, there is no manual copying of data between the general ledger and the database. Further, the latency between the general ledger and database is minimal ensuring accurate analysis even contemporaneous with the input of the data.

6 Claims, 10 Drawing Sheets

FUSION GENERAL LEDGER

BACKGROUND

Companies generally account for financial information in a ledger (which also may be referred to as a relational database or flat-file database) or other spreadsheet. These ledgers offer easy entry and maintenance of the accounting information. However, studying the information in the ledger is cumbersome or not possible. For example, it may be possible to determine revenues for one subsidiary over a predetermined amount of time. However, it may be very difficult or impossible to determine revenues for 15 foreign subsidiaries from selling a particular product during different times. The reason is that the data in the ledger is not stored in a manner where complex queries are easily made. To accomplish this type of analysis, a company may employ a database (i.e., a multi-dimensional database). Unfortunately, these databases are much more difficult to populate with data or it is much more difficult to maintain the data already input. Thus, companies are left with no accounting system that provides easy entry, maintenance and effective analysis.

BRIEF SUMMARY

The embodiments presented herein provide systems, methods, and data structures combining a ledger and a multi-dimensional database. The ledger and multi-dimensional database are characterized with metadata dimensions that map the ledger to the multi-dimensional database. After mapping, data can be received into the ledger. A synchronization of the data copies the data automatically to the multi-dimensional database. Thus, there is no manual copying of data between the ledger and the database. Further, the latency between the ledger and database is minimal, ensuring accurate analysis even contemporaneous with the input of the data.

Furthermore, aspects of the present invention allow for a relational database and a multi-dimensional database to never be out of sync with one another. This is due, in part to the fact that the present invention has a single process which updates data in both the relational database and the multi-dimensional database. Thus, one cannot be updated without the other also being updated.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Example Embodiment

The embodiments presented herein can be employed by a company or organization for organizing financial data. For example, a consumer products manufacturer and seller, such as Dell Computers, can store financial information in the database. First, a financial manager or other employee would describe the data that is presented in the company's general ledger. The description may include the products associated with the revenue, the store that received the revenue, the date the revenue was received, etc. These descriptions are input into the general ledger to a cube of the multi-dimensional database.

Figure 1:
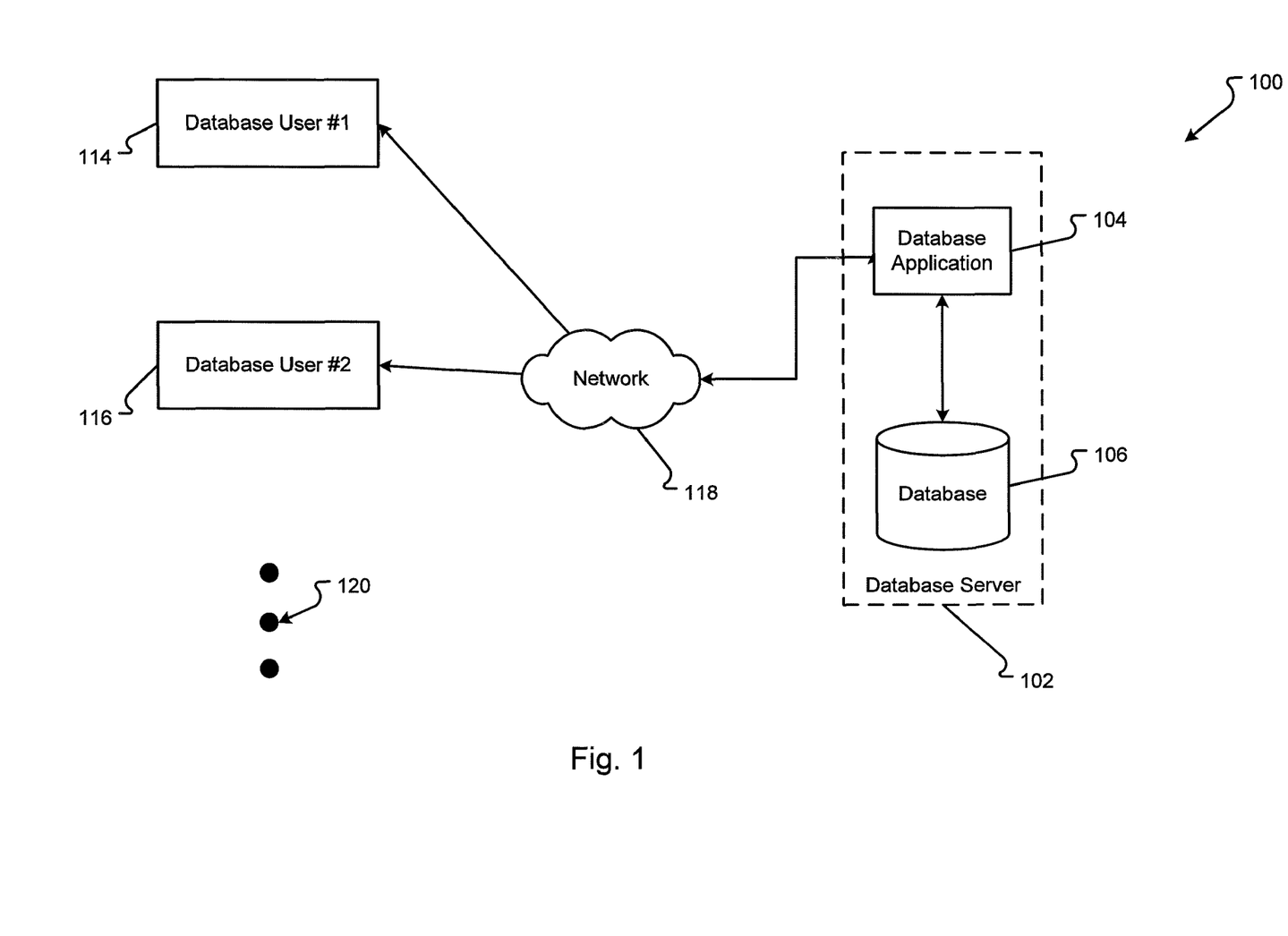
FIG. 1 is a block diagram of an embodiment of an accounting system.

As the financial employees enter financial data into the general ledger, the data is copied into the multi-dimensional database based on the definitional file. Thus, financial data for sales of laptops at a store in Denver during the month of March is entered into the general ledger. This data is transferred to the multi-dimensional database based on the product (laptops), the store location (Denver), and the date (March). When another employee wants to investigate the financial information, the employee enters a query. For example, the employee may want to know the revenue from all computers sold in Denver during March. The query can be reviewed and determined to be best met by the multi-dimensional database. Thus, the query is sent to the multi-dimensional database. The information entered above may compose a portion of the result returned to the employee. The systems, data structures, user interfaces, and methods that embody this example are described hereinafter The Database System An embodiment of a database system 100 is shown in FIG. 1. The one or more components comprising the database system 100 may be computer systems as described in conjunction with FIG. 8. Each component may be hardware and/or software operable to perform the functions described herein. The database system 100 can include at least a database server 102 in communication with one or more database users 114 and/or 116 through a network 118.

Database users 114 and/or 116 are computer systems that allow a user to enter, review, query, modify, or commit an action on the data stored in the database server 102. The database users 114 and/or 116 can include more or fewer database users than those shown in FIG. 1, as represented by the ellipses 120. The database users 114 and/or 116 may execute a software application that allows the user to interact with the database server 102. During the interaction with the user, the database users 114 and/or 116 can generate one or more user interfaces that allow the user to act on the financial data. A database user 114 or 116 can send messages to the database server 102. The messages can include an action to be performed on the data, financial data, and/or metadata describing the financial data. Likewise, the database user 114 or 116 may receive messages including financial data and/or metadata.

The database server 102 is also a computer system that receives, provides, organizes, and manages data in a database 106. A database server 102 can include the database 106 and a database application 104. The database 106 is the hardware and/or software required to store data both virtually and physically. A database 106 can be any memory or storage system as explained in conjunction with FIG. 8. The database application 104 is the software system operable to interact with the database users 114 and/or 116 and the database 106. The database application 104 can include one or more components as explained in conjunction with FIG. 2. A database application 104 can receive messages for the database server 102. The information in the messages, the action requested, the financial data, and/or the metadata, can instruct the database application 104 in executing an operation with the database 106. Further, the database application 104 can send to the database user 114 or 116 messages including financial data and/or metadata.

A network 118 may be one or more computer systems or other components that allow communications between the database users 114 and/or 116 and the database server 102. As explained herein, being in communication includes any arrangement of systems or component required to electrically couple one or more systems that allow for the exchange of electrical symbols. The network 118 can be a local area network (LAN), a wide area network (WAN), a wireless LAN, a wireless WAN, the Internet, or other network. The network 118 may be as explained in conjunction with FIGS. 8 and 9.

The Database Server

Figure 2:
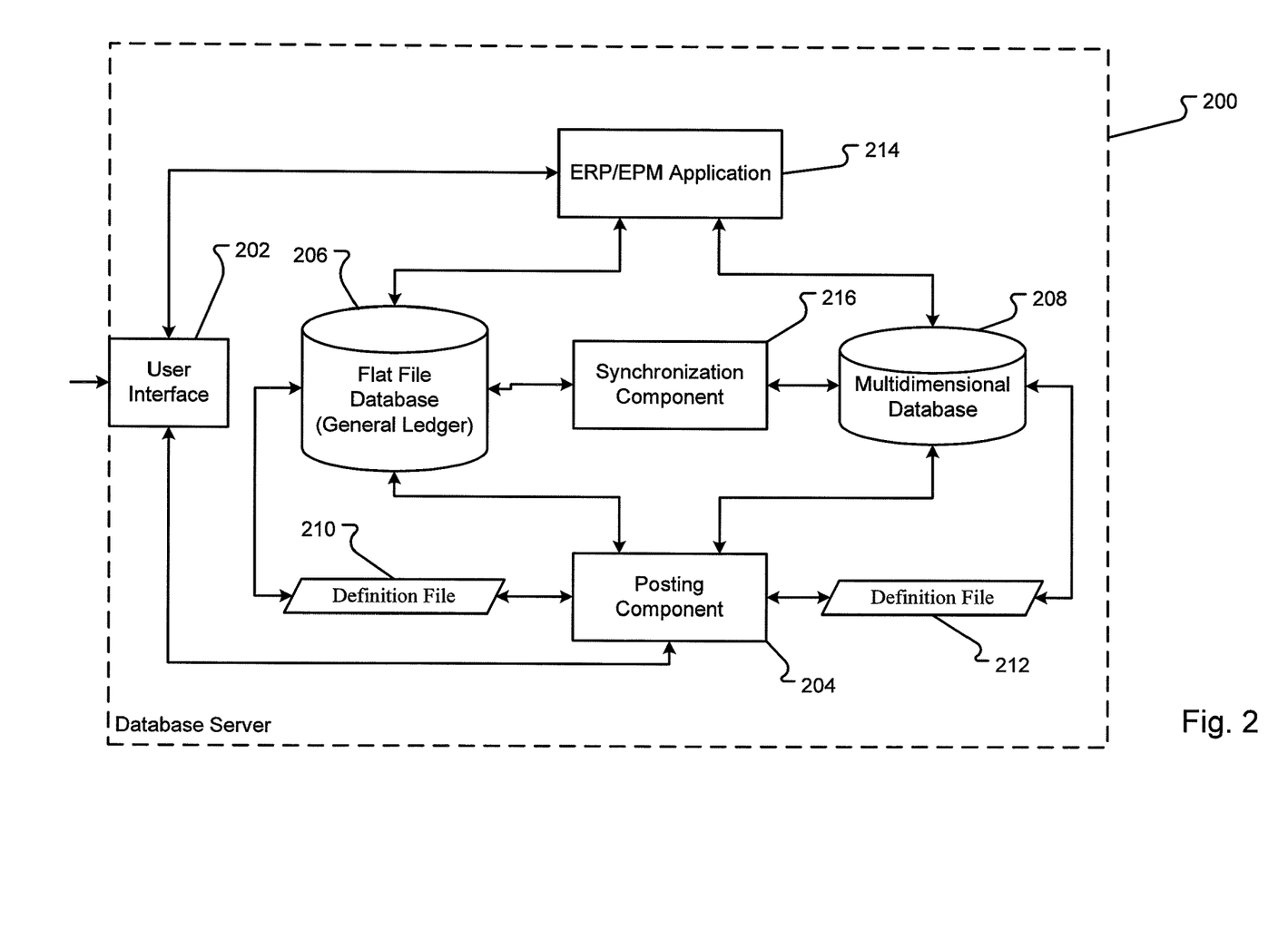
FIG. 2 is a block diagram of an embodiment of a database server.

An embodiment of a database server 200 is shown in FIG. 2. The components described in conjunction with database server 200 can be one or more software applications, modules, objects, etc. However, the function of the software components may be encompassed in hardware as a set of gates or other hardware components. The components perform the functions described herein.

A user interface 202 receives messages from and sends messages to the database users 114 and/or 116. The user interface 202 may also create one or more interfaces for display at the database users 114 and/or 116. For example, the user interface 202 may generate a user window for a general ledger as described in conjunction with FIG. 4. As part of storing data, the user interface 202 can receive financial data and accompanying metadata. The metadata can describe the financial data and inform how the financial data is to be stored. This received data and metadata can be sent to a posting component 204. The user interface 202 can also allow the database users 114 and/or 116 to interact with the financial data. Thus, the user interface 202 can receive requests to retrieve, read, modify, or commit another action on the data. These requests are sent to the ERP/EPM Application 214.

The posting component 204 manages the storing of financial data into the general ledger (the flat file database) 206 and/or the multidimensional database 208. The posting component 204 can receive the financial data and read the metadata included therewith. From the metadata description, the posting component 204 determines into which cell or cube to store the data. For example, the posting component 204 may retrieve a definition file 210 or 212 for the flat file database 206 or the multidimensional database 208, respectively. The metadata received with the financial data is compared to the definitional file 210 or 212. Upon finding a match, the posting component 204 identifies this cell or cube as receiving the financial data and stores the data into the identified cell or cube. An embodiment of the definitional file 210 or 212 may be as described in conjunction with FIG. 3.

The flat file database 206 can be a relational database having a two dimensional structure. Data can be stored in a cell of the flat file database 206 defined by a row and a column. The flat file database 206 may be the general ledger for an account. In contrast, the multidimensional database 208 can be an Online Analytical Processing (OLAP) database arranged in several dimensions. The dimensions define cubes of data. The multidimensional database 208 allows complex analytical and ad-hoc queries for the data not easily provided by the flat file database 206. For example, a relational (or flat file) database is typically best suited for recording large volumes of information in which a company needs to run business operations; however, a multi-dimensional database is best suited for the types of complex analytical and ad-hoc queries for which managers need in order to be able to make decisions. Accordingly, aspects of the present invention allow for the union (or integration) of these two disparate systems with no manual work needed to keep them synchronized and also provides zero latency between the two systems.

In a further embodiment, each cell of the flat file database 206 can be mapped to a cell of a cube in the multidimensional database 208. Thus, data stored into the flat file database 206 may be simultaneously stored in the corresponding mapped cube in the multidimensional database 208 or the related data may be synchronized later.

Typically, a general ledger is an enterprise resource planning (ERP) application, whereas analytical application and milti-dimensional databases traditionally have enterprise performance management (EPM) functionality. Accordingly, in accordance with aspects of the present invention, the ERP/EPM application 214 is an application configured to provide both ERP and EPM functions un a unified and integrated application. The ERP/EPM application 214 operates to provide or modify data in response to users' requests in either the flat file database 206 and/or the multidimensional database 208. To determine what modification is necessary, the ERP/EPM application 214 may determine the type of request received from the user. Then, depending on the determination of the type of request, the ERP/EPM application 214 can affect data in the flat file database 206 or the multidimensional database 208.

A synchronization component 216 may provide a function for ensuring data in the multidimensional database 208 and the flat file database 206 is the same. For example, if new data is posted by the posting component 204 in only the flat file database 206, the synchronization component 216 can copy the data from the flat file database 206 into the related cell in the multidimensional database 208. To effect the copy of data, the synchronization component 216 may read the mapping of the cells in the definition file 210 or 212. The mapping identifies where changes data need be transferred to in the other database. A change in the flat file database 206 or the multidimensional database 208 can be signaled by the setting of a dirty bit or other similar identifier. The synchronization component 216 may synchronize data between the flat file database 206 and the multidimensional database 208 upon command or automatically in response to a change or periodically. For example, the synchronization component 216 may copy data between the multidimensional database 208 and the flat file database 206 every ten minutes, once a day, or once a week. The period of the synchronization will depend on the latency required by the user. In other words, how often is the data in one of the databases used and how soon is the newest data needed?

Definitional File or Metadata

Figure 3:
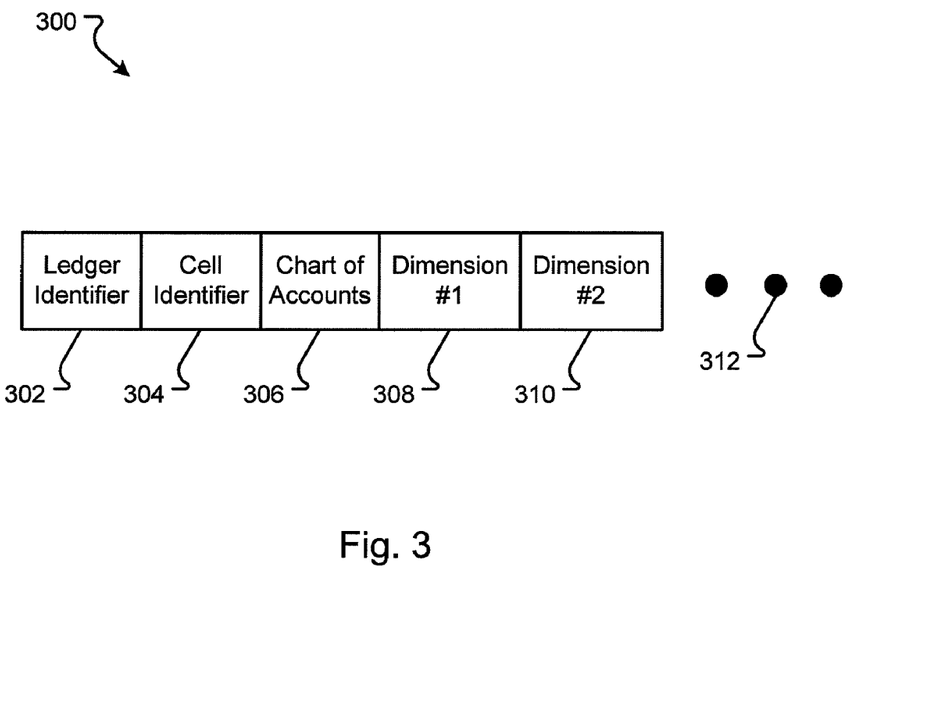
FIG. 3 is a block diagram of an embodiment of a data structure for defining a mapping between a ledger and a database.

An embodiment of a definitional file 300, similar to or the same as definition files 210 and/or 212, is shown in FIG. 2. The definitional file 300 includes a mapping between the multidimensional database 208 and the flat file database 206. There can be a definitional file 300 that maps each of several general ledgers 206 to the multidimensional database 208. The definitional file 300 includes fields that cause a computer system to execute one or more actions; the fields include one or more of, but are not limited to, a ledger identifier 302, a cell identifier 304, a chart of accounts field 306, dimension #1 field 308, and/or dimension #2 field 310. A mapping can include more of fewer fields, which can include more dimensions, as represented by the ellipses 312.

A ledger identifier 302 identifies the flat file in the flat file database 206. The flat file database 206 can include two or more flat files that represent a general ledger for a particular account. A ledger identifier 302 can be a globally unique identifier (GUID), an alphanumeric identifier, or some other identifier that identifies the ledger to the database user 114 and/or 116 or the database server 102. Similar to the ledger identifier 302, the cell identifier 304 identifies the cell in the ledger to the database user 114 and/or 116 or the database server 102. The cell identifier 304 can also be a GUID, an alphanumeric identifier, or some other identifier.

A chart of accounts field 306 can include a hierarchy for the general ledger or cell identified by the ledger identifier 302 and/or the cell identifier 304. The value or data placed in a cell in a first general ledger may be derived from another general ledger. For example, a first general ledger can have ten cells, each cell containing the total sales for a sales office. The total sales for a sales office can be based on another general ledger for that sales office. Thus, a chart of accounts can define from which other ledgers the present ledger obtains data and to which other ledgers the present ledger provides data. The chart of accounts field 306 can have data on a cell by cell basis, thus, providing a hierarchy for each cell. The cell identifiers 304 and ledger identifiers 302 can be recorded in the chart of accounts field 306 to record parent ledgers and cells and child ledgers and cells.

The mapping can also include one or more dimensions 308 and/or 310. Dimensions define the cubes in the multidimensional database 208. A dimension can be any category or characteristic of the data. For example, dimensions can include one or more of, but are not limited to, a ledger dimension, an accounting calendar dimension, a currency dimension, a chart of accounts dimension, a conversion rate, dimension, a currency type dimension, an amount type dimension, a third party dimension, a supporting reference dimension, and/or a legal entity dimension. Some of the dimensions may be included in other fields, for example, the ledger dimension may be incorporated in the ledger identifier 302 and the chart of accounts dimension may be incorporated in the chart of accounts field 306.

The account calendar dimension can include a time dimension, e.g., a date, for the financial data. The account calendar dimension can also include average balances for a given time period. A currency dimension can include a currency code for the financial data, e.g., USD, EURO, etc. A conversion rate type dimension can include the conversion rate between currencies for a given date, e.g., 1.5 USD per 1 EURO on Jan. 15, 2009. The currency type dimension can set a primary currency for the entries, e.g. USD, and all other currencies may be converted to this primary currency. An amount type dimension can include the type of financial data, e.g., period-to-date, quarter-to-date, year-to-date, project to-date, end-of-day, etc. type data. The third party dimension can describe if the financial data is from another organization. A supporting reference dimension can define any reference that explains the financial data, for example, a current project or task with which the financial data is associated. A legal entity dimension can describe the entity that generated the financial data, for example, a subsidiary, a branch office, etc. There may be other dimensions used, and the dimensions will depend on the user and the organization of the user's financial data.

User Interface

Figure 4:
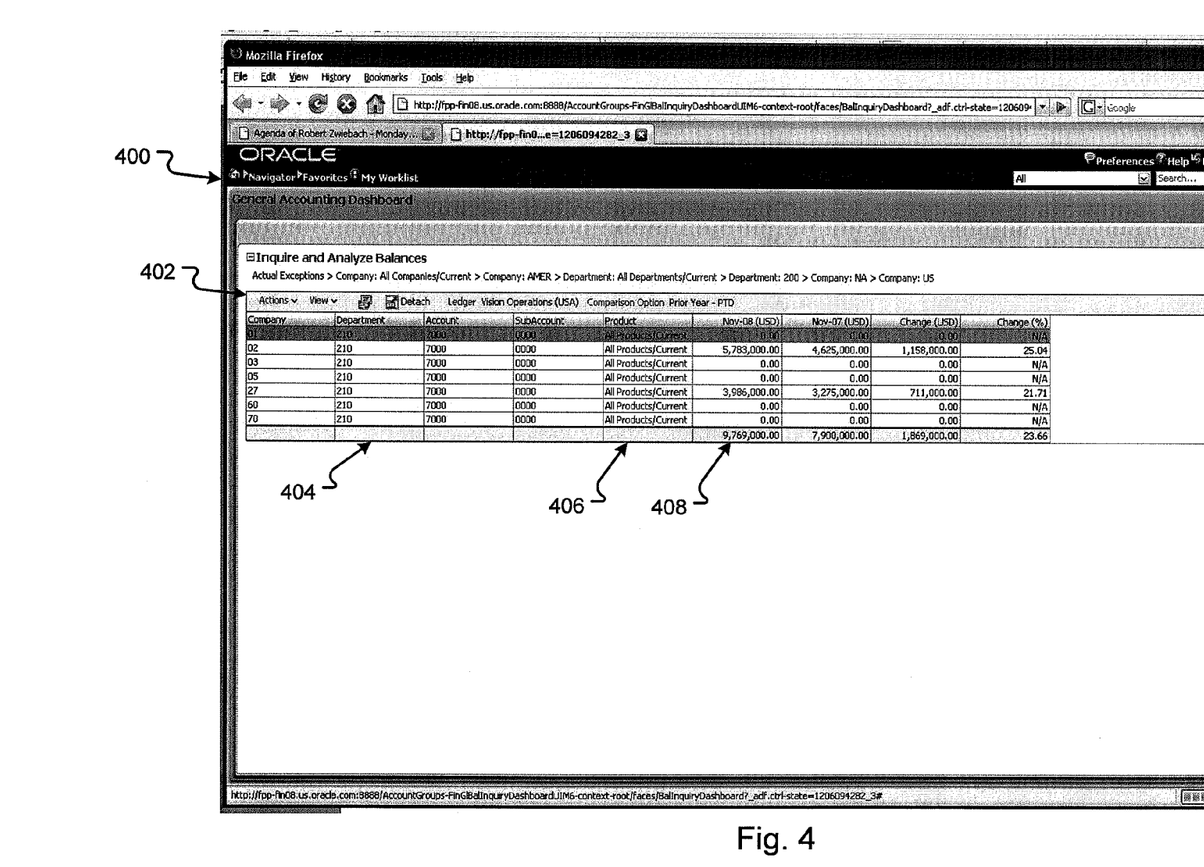
FIG. 4 is an embodiment of a user interface showing dimensions used in mapping a ledger to a database.

An embodiment of a user interface 400 providing a general ledger is shown in FIG. 4. The general ledger 402 can be mapped to the multidimensional database 208. For example, the department column 404 can map to a department dimension, as described in conjunction with FIG. 3. The product column 406 can map to a product dimension. Thus, each item of data, for example, in column 408, can have one or more dimensions that define where the data is stored in the multidimensional database 208.

Processes for Mapping and Organizing Data

Figure 5:
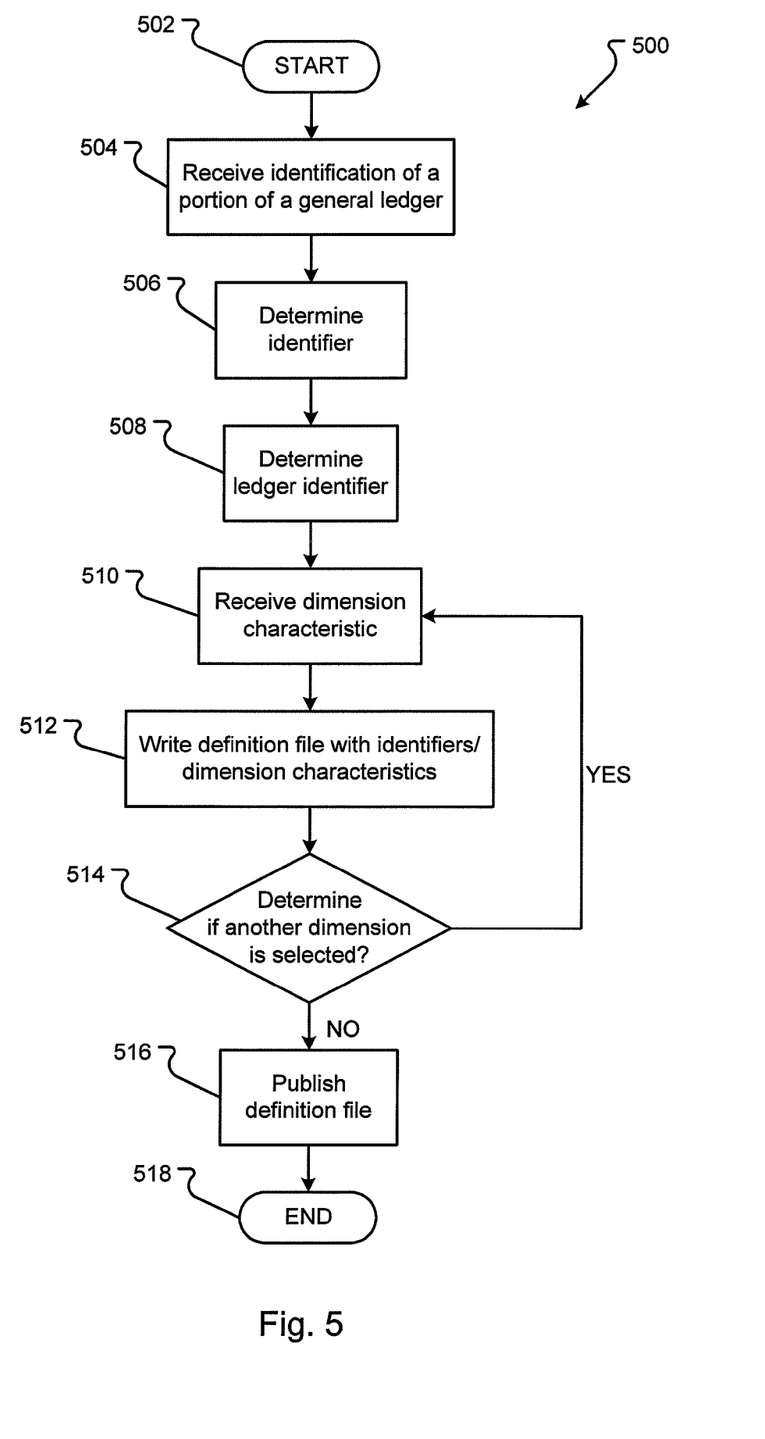
FIG. 5 is a flow diagram of an embodiment of a process for defining a mapping between a ledger and a database.

An embodiment of a method 500 for generating a mapping between a general ledger and a multidimensional database executed at a database server 102 is shown in FIG. 5. In embodiments, the method 500 generally begins with a START operation 502 and terminates with an END operation 518. The steps shown in the method 500 may be executed in a computer system as a set of computer-executable instructions. While a logical order is shown in FIG. 5, the steps shown or described can, in some circumstances, be executed in a different order than presented herein. Further, the steps shown in FIG. 5 may only be a subset of steps or may be substituted for other steps not shown in FIG. 5. The method 500 of FIG. 5 will be explained with reference to the drawings in FIGS. 1-4.

The database server 102 provides a user interface 400 to a database user 114. The user can identify a portion of the general ledger 206, such as a cell, column, table, or row. To identify the portion of the general ledger 206, the user may manipulate a user interface device to highlight or select the portion of the general ledger 206. The database server 102 receives the identification of the portion of the general ledger 206 in step 504. From the selection, the database server 102 determines an identifier, such as cell identifier 304, associated with the identified portion of the general ledger 206 in step 506. Each portion of the ledger, when created, has an identifier. When selected, the identifier can be determined by the location of the selection. The database server 102 may also determine one or more other identifiers for one or more other portions of the general ledger 206, such as the ledger identifier 302, in step 508.

The user may then identify a cube or portion of the multidimensional database 208. As with the general ledger 206, the user may select a portion of the multidimensional database 208 with a user interface device in a user interface. The portions of the multidimensional database 208 are created with dimensions. The selection of the portion of the multidimensional database 208 can identify the dimensional characteristics of the portion of the multidimensional database 208. The database server 102 receives the identified dimensional characteristics in step 5 10. A mapping may then be created.

The database server 102 writes a definitional file 210 including the identifiers for the general ledger 206 and the dimensional characteristics in step 512. An embodiment of a definitional file 300 was explained in conjunction with FIG. 3. As described, the definitional file 300 can include a cell identifier 304 and/or a ledger identifier 302. Further, the definitional file 300 may also include one or more dimensional characteristics 308 and/or 310. At least one identifier and dimensional characteristic are written to the definitional file 300 to map the general ledger 206 to the multidimensional database 208.

A user may select one or more other dimensional characteristics to the one or more identifiers. As such, each identifier may be defined by two or more dimensional characteristics. To accomplish the mapping to two or more dimensional characteristics, the database server 102 determines if another dimension is selected by the database user 114 in step 514. If and when another dimension is selected, the method 500 proceeds YES to receive the next dimension in step 510. When there is no other dimension selected, the method 500 proceeds NO to step 516, The database server 516 can then publish the definition file 210 by allowing other components to read or use the definition file 210 in step 516.

Processes for Writing Data

Figure 6:
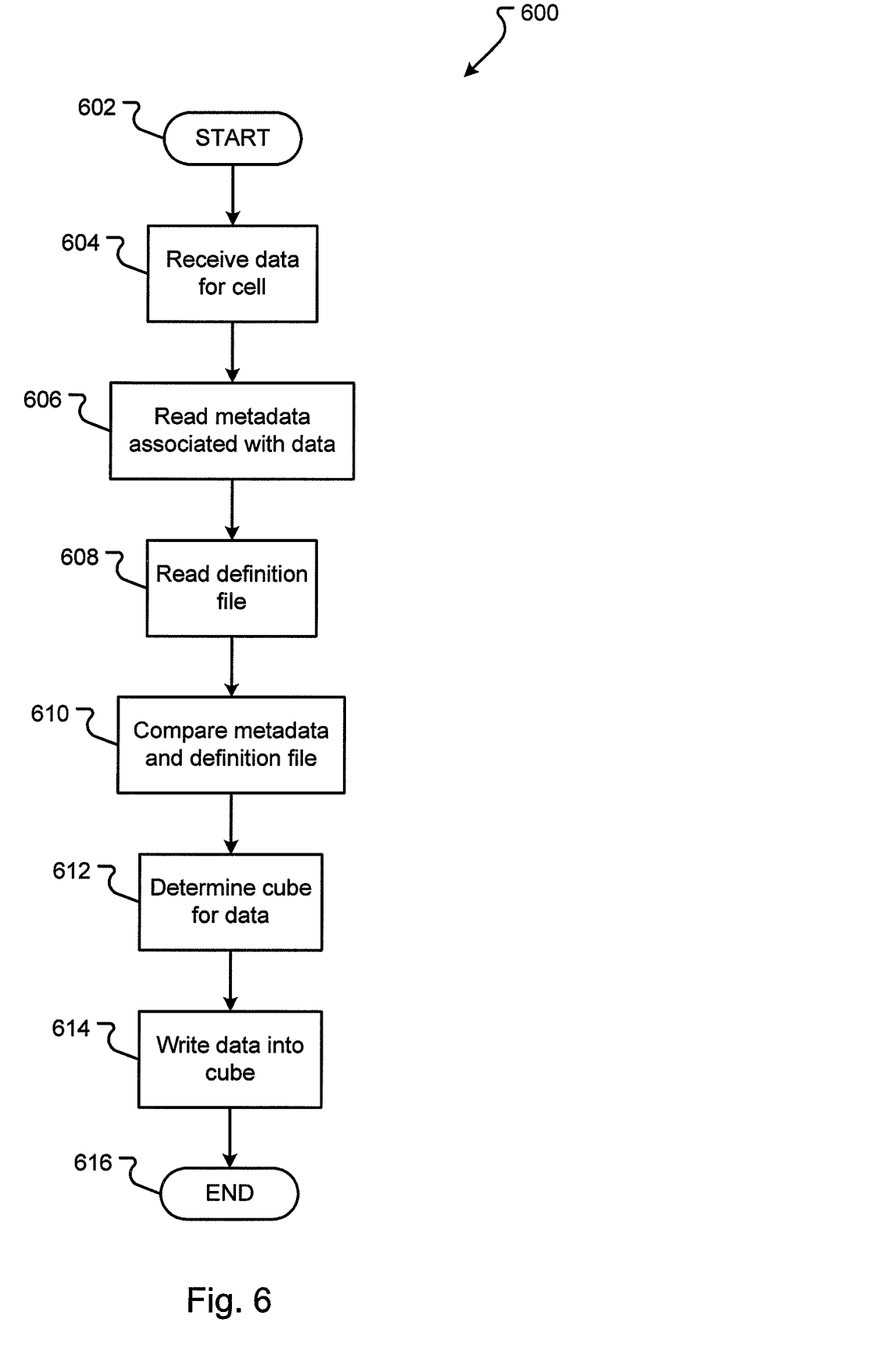
FIG. 6 is a flow diagram of an embodiment of a process for writing data to a ledger and a database.

An embodiment of a method 600 for writing data to a general ledger and a multidimensional database executed at a database server 102 is shown in FIG. 6. In embodiments, the method 600 generally begins with a START operation 602 and terminates with an END operation 616. The steps shown in the method 600 may be executed in a computer system as a set of computer-executable instructions. While a logical order is shown in FIG. 6, the steps shown or described can, in some circumstances, be executed in a different order than presented herein. Further, the steps shown in FIG. 6 may only be a subset of steps or may be substituted for other steps not shown in FIG. 6. The method 600 of FIG. 6 will be explained with reference to the drawings in FIGS. 1-4.

A user can input data into a database user 114 for a general ledger 206 stored at a database server 102. For example, a user enters data into a cell of the general ledger 400. Upon committing the data, the database server 102 can receive the data for the cell in step 604. The data may also include metadata similar to the data described in conjunction with FIG. 3. For example, the metadata can include the ledger identifier 302, the cell identifier 304, and one or more dimensional characteristics 308 and/or 310. The database server 102 can read the metadata associated with the received data in step 606.

A definitional file 210 or 212 can define structure for either the general ledger 206 or the multidimensional database 208. The database server 102 can retrieve and read the definitional file 210 or 212 in step 608. For example, the definitional file 210, also including information as described in conjunction with FIG. 3, includes ledger identifiers 302 and cell identifiers 304 that are read. The database server 102 compares one or more items in the metadata with one or more items in the definitional file 210 or 212 in step 610. One or more comparisons can be made, for example, comparing the ledger identifiers 302 and/or the cell identifiers 304. Based on the comparison, the database server can determine the cell in the general ledger 206 or the cube in the multidimensional database to which to write the data in step 612. In response to the determination, the database server 102 writes the data into the cell or cube in step 614.

An example of the process would have data entered into the general ledger 400. The data would be received by the database server 102 with at least a cell identifier 304. The cell identifier 304 is located in the definitional file 212, which determines the cube for the data in the multidimensional database 208. Then, the database server 102 can then write the data to both the general ledger 206 and the multidimensional database 208 without further information from the user.

Processes for Modifying Data

Figure 7:
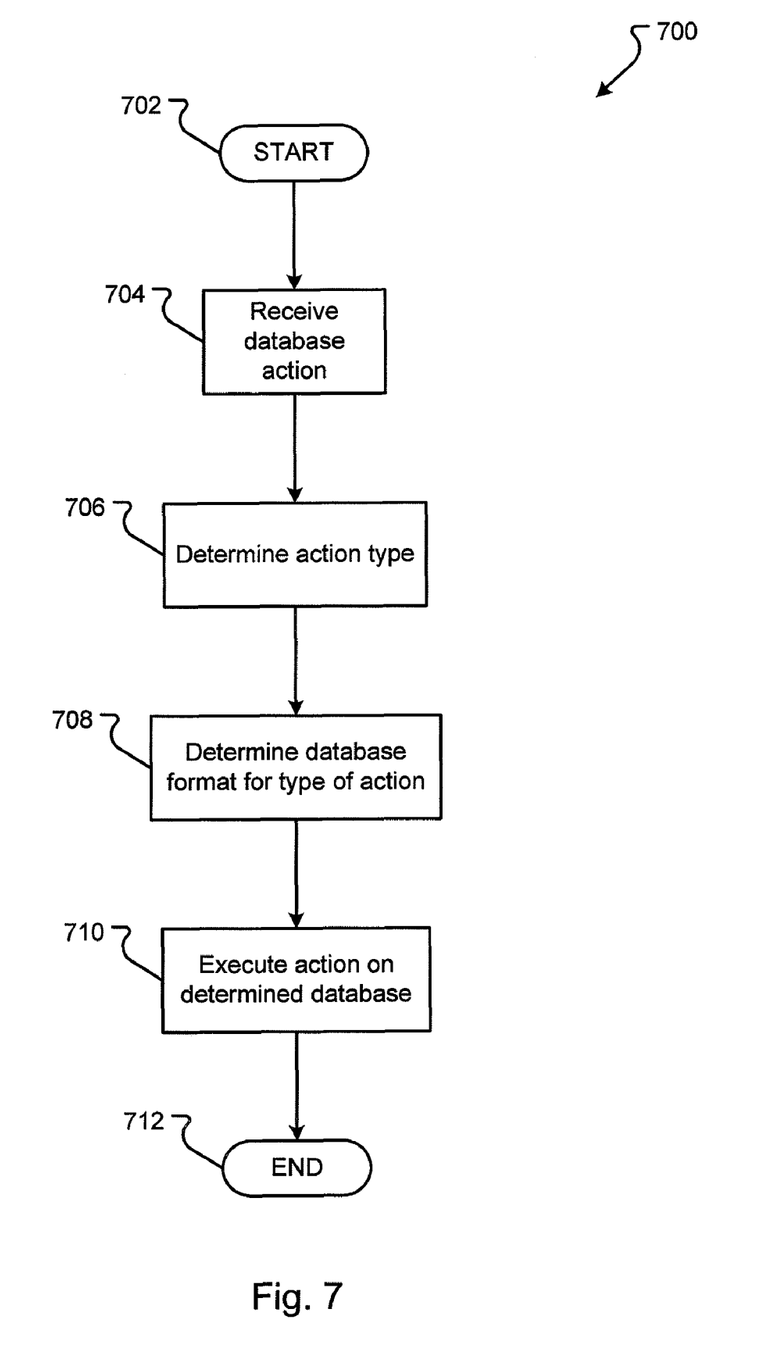
FIG. 7 is a flow diagram of an embodiment of a process for executing an action on accounting data.

An embodiment of a method 700 for modifying data stored in both a general ledger and a multidimensional database executed at a database server 102 is shown in FIG. 7. In embodiments, the method 700 generally begins with a START operation 702 and terminates with an END operation 712. The steps shown in the method 700 may be executed in a computer system as a set of computer-executable instructions. While a logical order is shown in FIG. 7, the steps shown or described can, in some circumstances, be executed in a different order than presented herein. Further, the steps shown in FIG. 7 may only be a subset of steps or may be substituted for other steps not shown in FIG. 7. The method 700 of FIG. 7 will be explained with reference to the drawings in FIGS. 1-4.

A user can conduct operations or actions on data stored in the general ledger 206 or the multidimensional database 208. The operations can include creating new data, changing existing data, reformatting data, query, etc. Operations or actions can be conducted with a user interface device in the database user 114 on a user interface 400. The operations may employ an ERP/EPM application 214 to conduct the action. Further, the action can be performed on the data in either the general ledger 206 or the multidimensional database 208 or may be submitted generally without being directed at either a general ledger 206 or the multidimensional database 208. Upon committing the action, the ERP/EPM application 214 of the database user 102 may receive the database action in step 704. Based on the user actions as received by the database user 114, the ERP/EPM application 214 can determine the type of action performed in step 706.

Based on the type of database action, the ERP/EPM application 214 can determine upon which of the general ledger 206 or the multidimensional database 208 to execute the action in step 708. The definitional file 210 and/or 212 may determine which actions the general ledger 206 or the multidimensional database 208 shall execute. Each action may be better suited on one type of format of database. For example, the multidimensional database 208 may be better suited to querying data while the general ledger 206 may be better suited for currency conversions. In response to the determination of which of the general ledger 206 or the multidimensional database 208 upon which to execute the action, the ERP/EPM application 214 executes the action in either the general ledger 206 or the multidimensional database 208 in step 710.

Processes for Synchronizing Data

Figure 8:
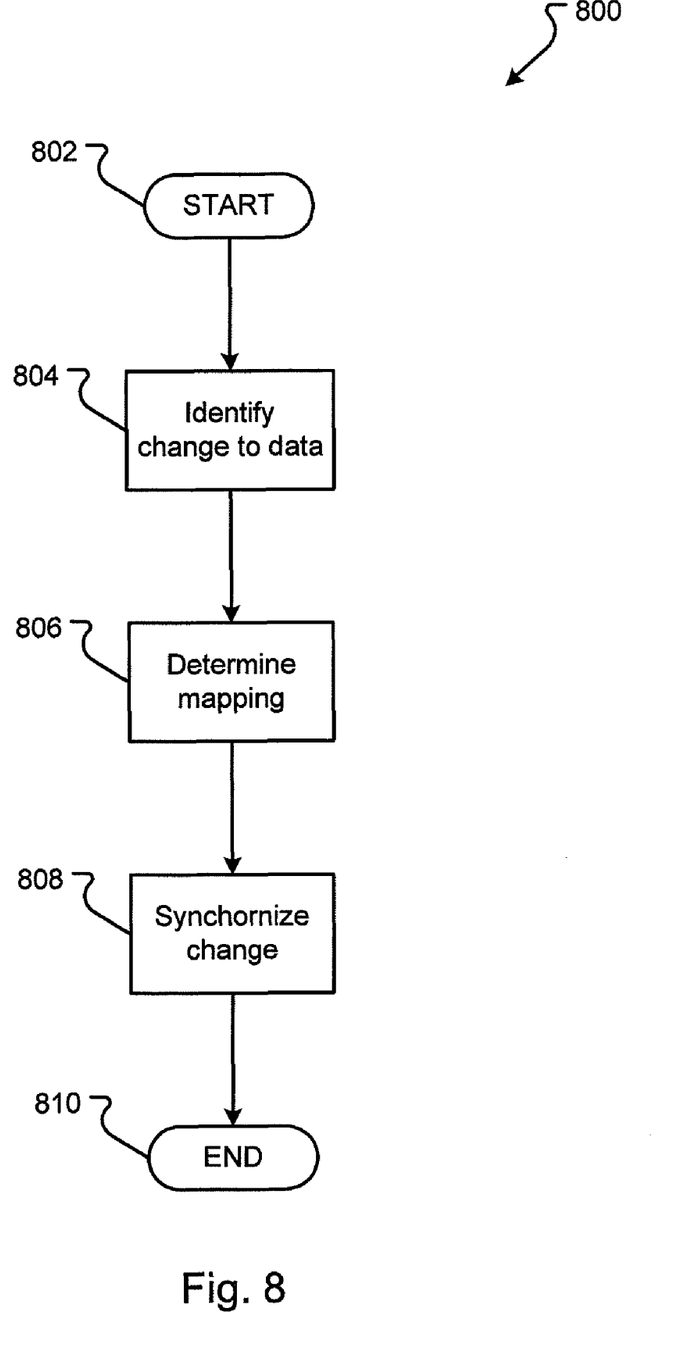
FIG. 8 is a flow diagram of an embodiment of a process for synchronizing changes between a ledger and a database.

An embodiment of a method 800 for synchronizing data between a general ledger and a multidimensional database executed at a database server 102 is shown in FIG. 8. In embodiments, the method 800 generally begins with a START operation 802 and terminates with an END operation 810. The steps shown in the method 800 may be executed in a computer system as a set of computer-executable instructions. While a logical order is shown in FIG. 8, the steps shown or described can, in some circumstances, be executed in a different order than presented herein. Further, the steps shown in FIG. 8 may only be a subset of steps or may be substituted for other steps not shown in FIG. 8. The method 800 of FIG. 8 will be explained with reference to the drawings in FIGS. 1-4.

The database server 102 identifies a change to data in either the general ledger 206 or the multidimensional database 208 in step 804. The change may be from an action performed by the ERP/EPM application 214 or from a posting of new data by the posting component 204. A change can be recognized by the setting of a "change" or "dirty" bit or flag. The change flag signifies the data in the general ledger 206 or the multidimensional database 208 is different.

The synchronization component 216 can identify the change for the database server 102 and then determine the mapping for the data in step 806. The synchronization component 216 may retrieve a definition file 210 or 212 and read an identifier for the data in either the general ledger 206 or the multidimensional database 208. After finding the identifier, the synchronization component 216 can determine the mapped section in the other database. For example, if the synchronization component 216 identifies the cell identifier 304 in the definitional file 210 for data in the general ledger 206, then, the synchronization component 216 can determine the mapping of the data in the multidimensional database 208 based on the one or more dimension characteristics 308 and/or 310.

After determining the mapping, the synchronization component 216 can synchronize the change between the general ledger 206 or the multidimensional database 208 in step 808. Thus, if the change is in the general ledger 206, the synchronization component 216 copies the change to the multidimensional database 208 or vice versa. It is possible to complete the synchronization as changes are made or complete several changes in a batch mode. For example, every day at midnight the synchronization component 216 can synchronize the changes between the general ledger 206 and the multidimensional database 208. The method used, that is, near real-time changes or batch synchronization, will depend on the needs of the user, such as latency tolerance, processing requirements, number of changes, etc.

Computer Systems

Figure 9:
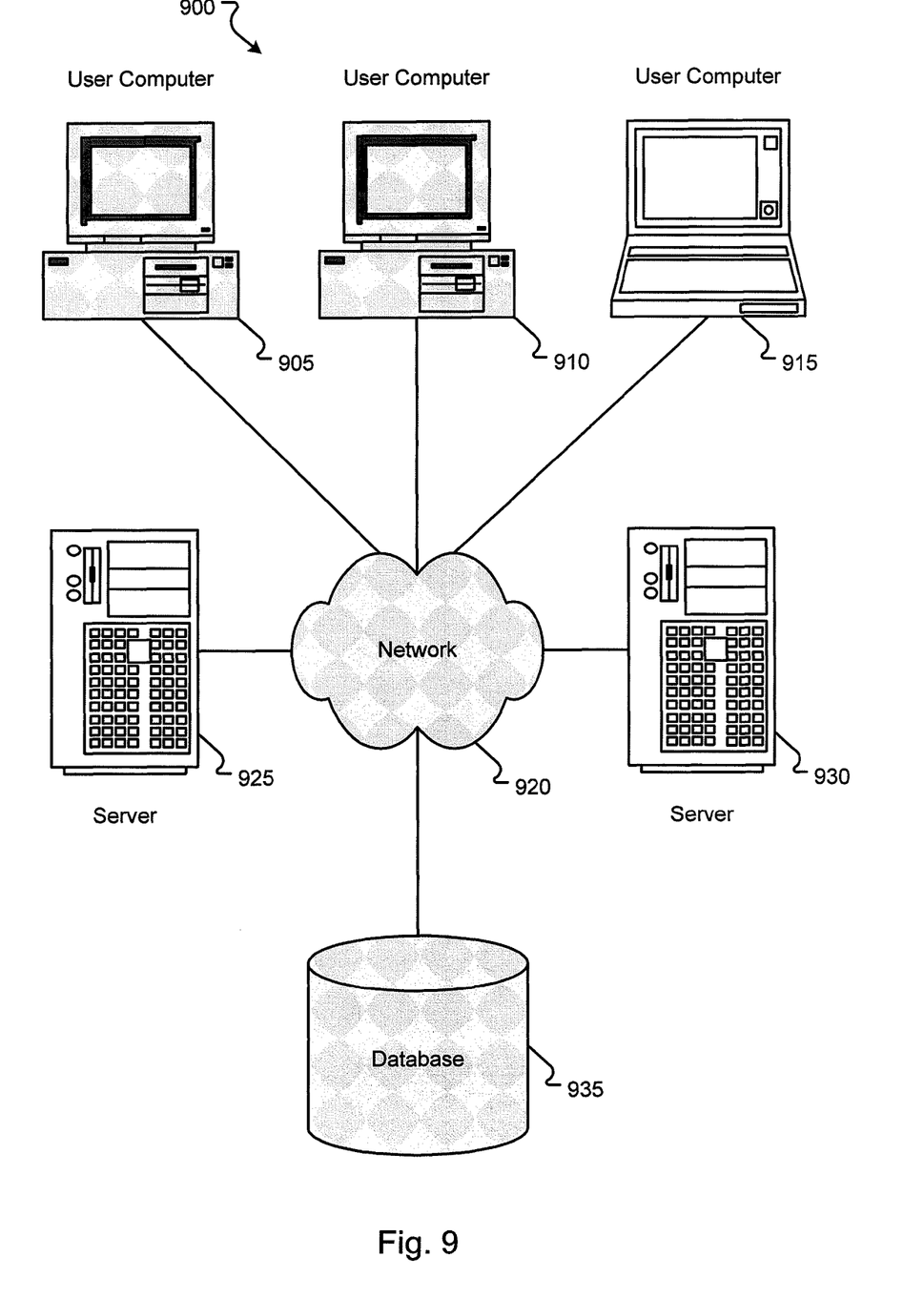
FIG. 9 is a block diagram of an embodiment of a networked computing system operable to function in one or more embodiments presented herein.

An embodiment of a system 900 that may execute a database system 100 to manage database data is shown in FIG. 9. The system 900 includes one or more user computers 905, 910, and 915. The user computers 905, 910, and 915 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially available UNIX™ or UNIX-like operating systems. These user computers 905, 910, 915 may also have any of a variety of applications, including, for example, database client and/or server applications, and web browser applications. Alternatively, the user computers 905, 910, and 915 may be any other electronic device, such as a thin-client computer, Internet-enabled mobile telephone, and/or personal digital assistant, capable of communicating via a network (e.g., the network 920 described below) and/or displaying and navigating web pages or other types of electronic documents. Although the exemplary system 900 is shown with three user computers, any number of user computers may be supported. The user computers 905, 910, and 915 may form the database users 114 and/or 116.

System 900 further includes a network 920. The network 920 may be any type of network, familiar to those skilled in the art, that can support data communications using any of a variety of commercially available protocols, including without limitation TCP/IP, SNA, IPX, AppleTalk, and the like. Merely by way of example, the network 920 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 902.11 suite of protocols, the Bluetooth™ protocol known in the art, and/or any other wireless protocol); and/or any combination of these and/or other networks. The network 920 can form the network 118.

The system may also include one or more server computers 925, 930. One server may be a web server 925, which may be used to process requests for web pages or other electronic documents from user computers 905, 910, and 920. The web server can be running an operating system including any of those discussed above, as well as any commercially available server operating systems. The web server 925 can also run a variety of server applications, including HTTP servers, FTP servers, CGI servers, database servers, Java servers, and the like. In some instances, the web server 925 may publish operations available operations as one or more web services.

The system 900 may also include one or more file and or/application servers 930, which can, in addition to an operating system, include one or more applications accessible by a client running on one or more of the user computers 905, 910, 915. The server(s) 930 may be one or more general purpose computers capable of executing programs or scripts in response to the user computers 905, 910 and 915. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 930 may also include database servers such as database server 102, including without limitation those commercially available from Oracle, Microsoft, Sybase™, IBM™ and the like, which can process requests from database clients running on a user computer 905.

In some embodiments, an application server 930 may create web pages dynamically for displaying the database system. The web pages created by the web application server 930 may be forwarded to a user computer 905 via a web server 925. Similarly, the web server 925 may be able to receive web page requests, web services invocations, and/or input data from a user computer 905 and can forward the web page requests and/or input data to the web application server 930.

In further embodiments, the server 930 may function as a file server. Although for ease of description, FIG. 1 illustrates a separate web server 925 and file/application server 930, those skilled in the art will recognize that the functions described with respect to servers 925, 930 may be performed by a single server and/or a plurality of specialized servers, depending on implementation-specific needs and parameters.

The system 900 may also include a database 935, such as database 106. The database 935 may reside in a variety of locations. By way of example, database 935 may reside on a storage medium local to (and/or resident in) one or more of the computers 905, 910, 915, 925, 930. Alternatively, it may be remote from any or all of the computers 905, 910, 915, 925, 930, and in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10i™, that is adapted to store, update, and retrieve data in response to SQL-formatted commands.

Figure 10:
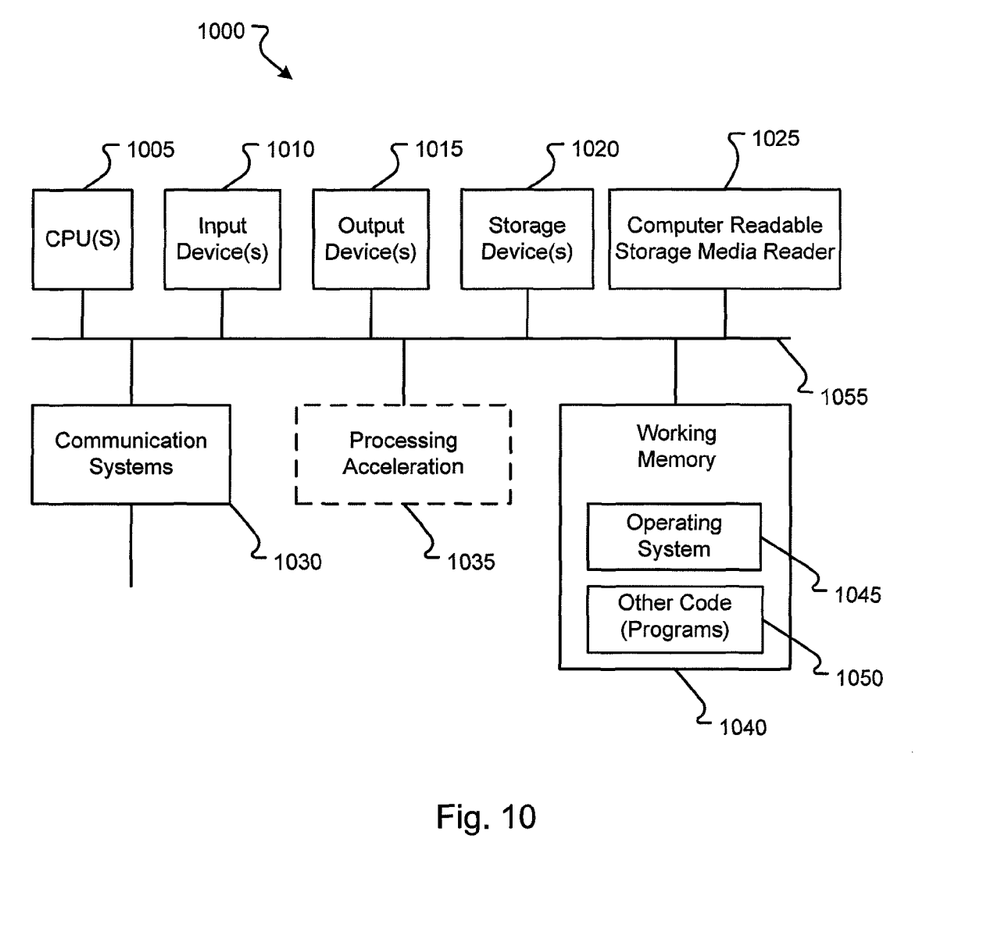
FIG. 10 is a block diagram of an embodiment of a computer system operable to function as one or more embodiments presented herein.

An embodiment of a computer system 1000 upon which a database user 114 or 116 and/or database server 102 may be deployed or executed is shown in FIG. 10. The computer system 1000 is shown comprising hardware elements that may be electrically coupled via a bus 1055. The hardware elements may include one or more central processing units (CPUs) 1005; one or more input devices 1010 (e.g., a mouse, a keyboard, etc.); and one or more output devices 1015 (e.g., a display device, a printer, etc.). The computer system 1000 may also include one or more storage devices 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025; a communications system 1030 (e.g., a modem, a network card (wireless or wired), an infra-red communication device, etc.); and working memory 1040, which may include RAM and ROM devices as described above. In some embodiments, the computer system 1000 may also include a processing acceleration unit 1035, which can include a DSP, a special-purpose processor and/or the like.

The computer-readable storage media reader 1025 can further be connected to a computer-readable storage medium, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000.

The computer system 1000 may also comprise software elements, shown as being currently located within a working memory 1040, including an operating system 1045 and/or other code 1050, such as program code implementing a posting component 204, synchronization component 216, and/or the ERP/EPM application 214. It should be appreciated that alternate embodiments of a computer system 1000 may have numerous variations different from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The embodiments presented herein include several alternatives. For example, new data added to general ledger 206 or the multidimensional database 208 may be entered into either the general ledger 206 or the multidimensional database 208. However, when received by the database server 200, the database server 200 may, substantially simultaneously, write the new data to both the general ledger 206 and the multidimensional database 208. In an alternative, the data may be written to only one of the general ledger 206 or the multidimensional database 208 and then synchronized automatically at a latter time. Thus, the data can be input easily by the user and automatically copied between the general ledger 206 or the multidimensional database 208 without user intervention.

Further, the mapping between the general ledger 206 and the multidimensional database 208 can be accomplished in various ways. There may be no definitional file 210 or 212 needed in some embodiments. For example, requests for changes to or postings of data to the general ledger 206 or the multidimensional database 208 can include all required metadata to determine the mapping of the data into both the general ledger 206 and the multidimensional database 208. Alternatively, there may be only one definitional file 210 or 212 having all mappings between the general ledger 206 and the multidimensional database 208. Still further, the general ledger 206 or the multidimensional database 208 or both the general ledger 206 and the multidimensional database 208 can include metadata, stored with the general ledger 206 or the multidimensional database 208 and containing the mappings, without a separate definitional file.

The advantages of the embodiments presented herein are numerous. The integration of the general ledger 206 or the multidimensional database 208 eliminates the need for the database user to employ to database systems that provide different functionality. For example, the database user does not need a general ledger for easy data input and a separate multidimensional database for easy query and data manipulation. Rather, the database user, with the embodiments herein, is presented the functionality of both the general ledger 206 and the multidimensional database 208 in a common and simple interface. The ERP/EPM application further provides that common interface; thus, the embodiments also eliminate the need for separate interfaces to the general ledger 206 and the multidimensional database 208.

The embodiments also eliminate the difficult and time-consuming process of manually copying data between the general ledger 206 and the multidimensional database 208. When providing new data, the embodiments can simply write data to both the general ledger 206 and the multidimensional database 208 automatically. Thus, the user enters data once and does not copy the data over to the associated general ledger 206 or the multidimensional database 208. Further, changes to data are automatically synchronized and this automatic synchronization eliminates the need to copy changes between the general ledger 206 and the multidimensional database 208. The automatic synchronization ensures like data between the general ledger 206 and the multidimensional database 208 and reduces false query returns. Embodiments herein also reduce data latency between the general ledger 206 and the multidimensional database 208.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method executed in a computer system including a processor and memory for storing data, the method including:
    receiving data for a cell in a general ledger;
    determining an identifier for the cell;
    determining a cube in a multidimensional database associated with the cell, wherein the determining of the cube in the multidimensional database associated with the cell comprises:
> receiving metadata with the data for the cell,
> reading a definitional file,
>> comparing a cell identifier in the metadata with two or more cell identifiers in the definitional file, and
>> when the cell identifier in the metadata compares to the cell identifier in the definitional file, reading two or more dimensional characteristics from the definitional file that define the location of the cube in the multidimensional database; and
> writing the data to the general ledger and the multidimensional database simultaneously.

2. The method as defined in claim 1, wherein determining the identifier for the cell comprises:
receiving metadata with the data for the cell; and
reading a cell identifier in the metadata.

3. The method as defined in claim 1, wherein determining the cube in the multidimensional database associated with the cell comprises:
receiving metadata with the data for the cell; and
reading two or more dimensional characteristics in the metadata defining the location of the cube in the multidimensional database.

4. The method as defined in claim 1, further comprising:
receiving an identification of a portion of the general ledger;
determining an identifier for the portion of the general ledger;
determining a ledger identifier for the general ledger;
receiving a dimensional characteristic for the multidimensional database, the dimensional characteristic defining a portion of the multidimensional database associated with the portion of the general ledger;
writing a definitional file including the identifier for the portion of the general ledger, the ledger identifier, and the dimensional characteristic; and
publishing the definitional file.

5. A non-transitory computer-readable storage medium having sets of instructions storage thereon which, when executed by a computer, cause the computer to:
receive data for a cell in a general ledger;
determine an identifier for the cell;
determine a cube in a multidimensional database associated with the cell, wherein the determining of the cube in the multidimensional database associated with the cell comprises:
> receiving metadata with the data for the cell,
> reading a definitional file,
> comparing a cell identifier in the metadata with two or more cell identifiers in the definitional file, and
> when the cell identifier in the metadata compares to the cell identifier in the definitional file, reading two or more dimensional characteristics from the definitional file that define the location of the cube in the multidimensional database; and write the data to the general ledger and the multidimensional database simultaneously.

6. A system comprising:
a non-transitory computer-readable storage medium;
a processor in communication with the non-transitory storage medium having sets of instructions storage thereon which, when executed by the processor, cause the processor to:
receive data for a cell in a general ledger;
determine an identifier for the cell;
determine a cube in a multidimensional database associated with the cell, wherein the determining of the cube in the multidimensional database associated with the cell comprises:
> receiving metadata with the data for the cell,
> reading a definitional file,
> comparing a cell identifier in the metadata with two or more cell identifiers in the definitional file, and
> when the cell identifier in the metadata compares to the cell identifier in the definitional file, reading two or more dimensional characteristics from the definitional file that define the location of the cube in the multidimensional database; and write the data to the general ledger and the multidimensional database simultaneously.

* * * * *

UNITED STATES PATENT AND TRADEMARK OFFICE
CERTIFICATE OF CORRECTION

| | | |
|---|---|---|
| PATENT NO. | : 8,156,150 B2 | Page 1 of 1 |
| APPLICATION NO. | : 12/484596 | |
| DATED | : April 10, 2012 | |
| INVENTOR(S) | : Ng et al. | |

It is certified that error appears in the above-identified patent and that said Letters Patent is hereby corrected as shown below:

On sheet 8 of 10, in figure 8, Box. 808, line 1, delete "Synchornize" and insert -- Synchronize --, therefor.

In column 2, line 47, after "hereinafter" insert -- . --.

In column 4, line 32, delete "Typlically," and insert -- Typically, --, therefor.

In column 4, line 34, delete "milti" and insert -- multi --, therefor.

In column 4, line 38, delete "un" and insert -- in --, therefor.

In column 4, line 57, delete "be transferred to" and insert -- to be transferred --, therefor.

In column 5, line 23, delete "user" and insert -- users --, therefor.

In column 5, line 26, delete "user" and insert -- users --, therefor.

In column 5, line 50, delete "rate," and insert -- rate --, therefor.

In column 6, line 62, delete "5 10." and insert -- 510. --, therefor.

In column 7, line 42, delete "3 10." and insert -- 310. --, therefor.

Signed and Sealed this
Thirty-first Day of July, 2012

David J. Kappos
*Director of the United States Patent and Trademark Office*